Jan. 21, 1958     W. F. GOLDING     2,820,368
MECHANISM FOR CONVERTING CONTINUOUS INTO INTERMITTENT MOTION
Filed Nov. 6, 1956                    4 Sheets-Sheet 3

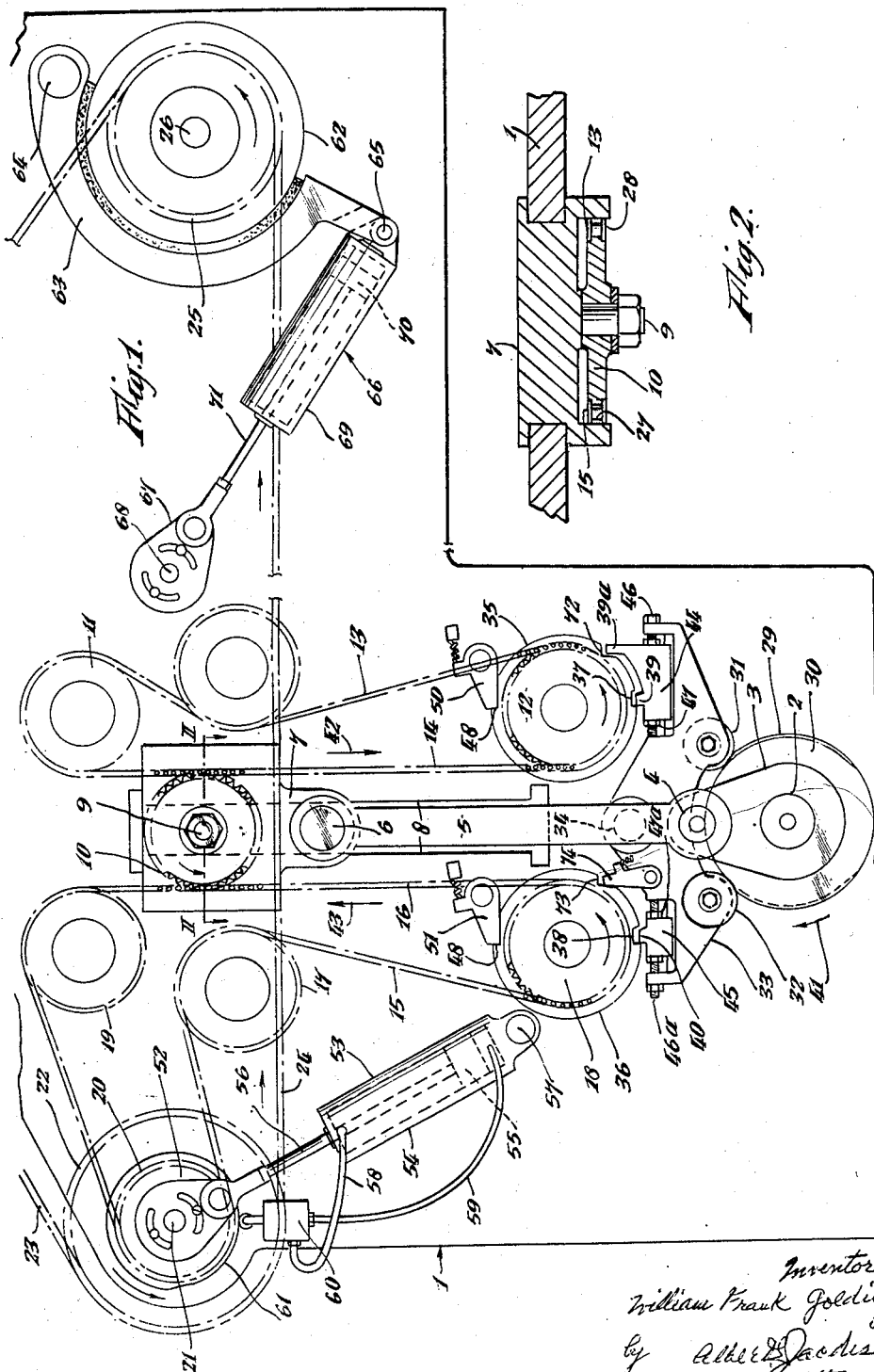

Jan. 21, 1958 W. F. GOLDING 2,820,368
MECHANISM FOR CONVERTING CONTINUOUS INTO INTERMITTENT MOTION
Filed Nov. 6, 1956 4 Sheets-Sheet 4
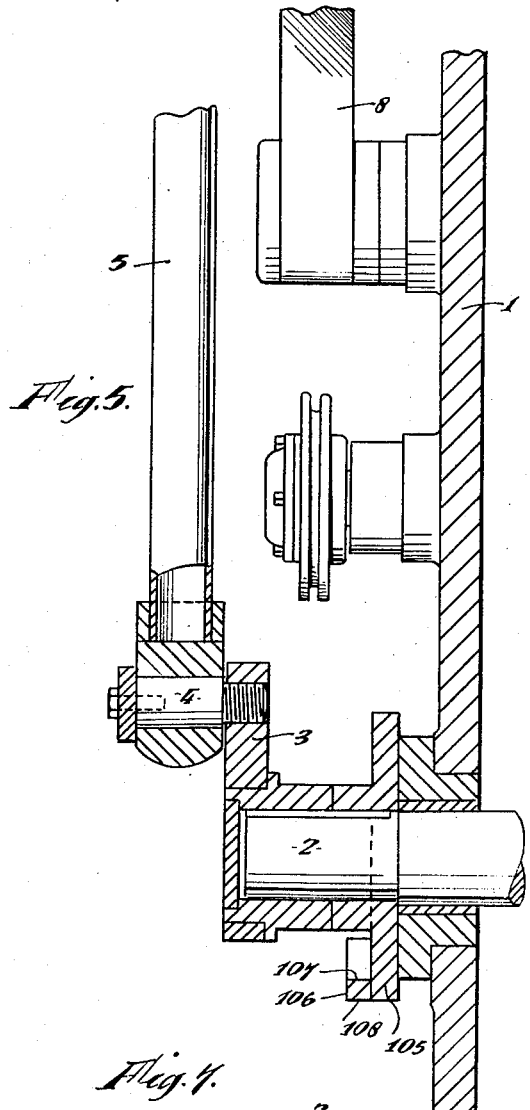
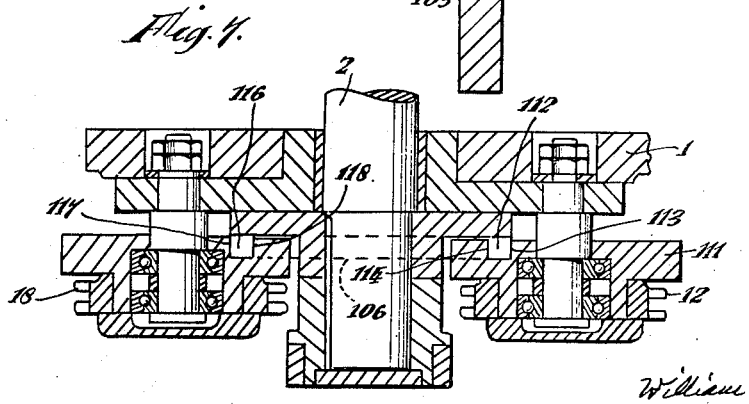
Inventor
William Frank Golding
by Albert Jacobs
Attorney

United States Patent Office 2,820,368
Patented Jan. 21, 1958

2,820,368

MECHANISM FOR CONVERTING CONTINUOUS INTO INTERMITTENT MOTION

William Frank Golding, Bristol, England

Application November 6, 1956, Serial No. 620,692

Claims priority, application Great Britain November 7, 1955

11 Claims. (Cl. 74—37)

This invention relates to a mechanism for converting continuous into intermittent motion and is particularly applicable to sheet feeding devices where the continuous rotary motion of a drive shaft has to be translated into the intermittent uni-directional motion of chains carrying sheet gripping devices.

According to this invention a mechanism for converting continuous into intermittent motion comprises an input shaft, a slide supported for rectilinear motion in a guide, means for converting continuous rotary motion of said shaft into reciprocating motion of the slide along said guide, a freely rotatable chain drive sprocket mounted on said slide, first and second endless chains supported on sprockets on a frame, said chains being positioned to have straight runs parallel to said guide and positioned for said runs to engage said drive sprocket at diametrically opposite points thereof, locking means for locking said chains against travel, said locking means being timed to act alternately on said chains to lock said first chain whilst freeing said second chain and vice versa, the locking means being timed to lock or free the chains when the slide stands still; whereby, on movement of the slide, the drive sprocket rolls on the locked chain and imparts movement to the free chain and continuous rotary motion of said input shaft is translated into unidirectional intermittent motion of said chains.

As each chain is held it acts as a rack for the drive sprocket whose rotation then causes the other chain to travel at twice the speed of and in the same direction as the slide. Thus continuous rotation of the input shaft is translated into a one-way intermittent motion of the chains.

The slide may be driven from the input shaft by a crank and the chains may each drive an output shaft, so that the continuous rotation of the input shaft is translated into an alternately timed one-way intermittent rotation of the output shafts.

If only one of the chains is used as an output member the other chain merely makes an idle journey while the one chain stands still.

Constructional embodiments of this invention, as applied to a sheet feeding device for a cardboard cutting, creasing and embossing press, will now be described; said sheet feeding device comprising conveyor chains provided with sheet gripping devices and required to travel with a uni-directional intermittent motion in which the conveyor chains are stopped for a sheet to be picked up by one of the gripping devices, moved for the sheet to be brought into position between the platens of the press, stopped for the sheet to be worked by the platens, moved for the sheet to be taken from the platens to a sheet release point, and stopped while the sheet is released. The present invention is concerned, in this example, with converting the continuous rotary movement of a shaft of the press into the necessary intermittent motion of the conveyor chains.

In the accompanying drawings:

Fig. 1 is a side elevation of a press as aforesaid.

Fig. 2 is a section on the line II—II in Fig. 1.

Fig. 5 is a section on the line V—V in Fig. 3.

Fig. 7 is a section on the line VII—VII in Fig. 3.

Figure 3:
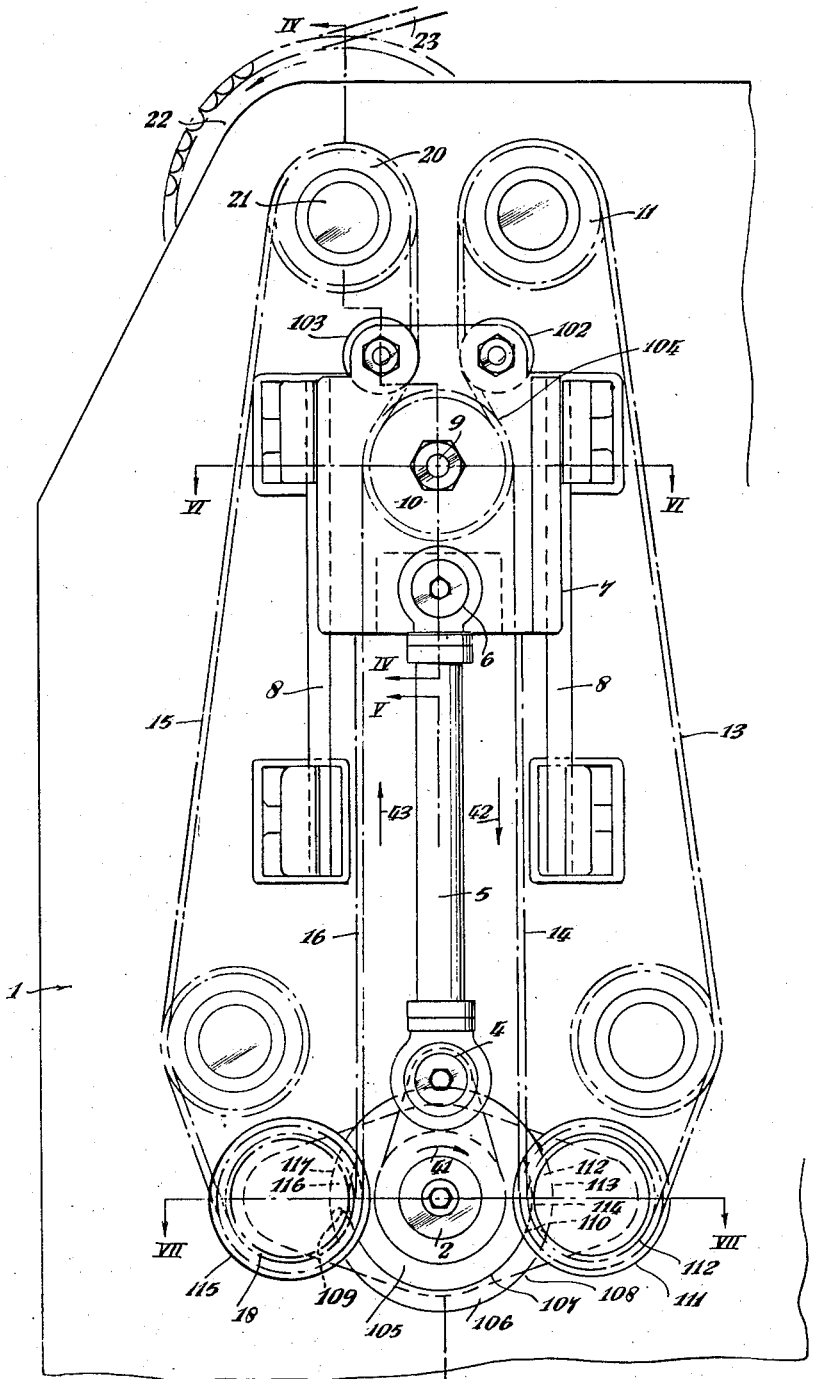
Fig. 3 is a side elevation of a press as aforesaid and shows a modified form of the mechanism.
Figure 6:
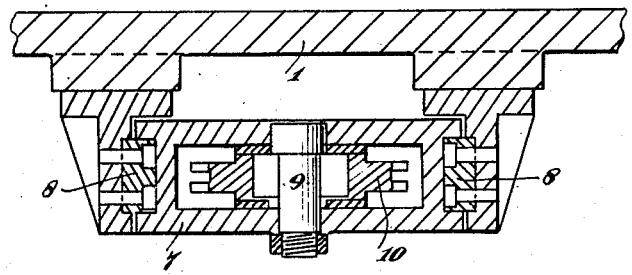
Fig. 6 is a section on the line VI—VI in Fig. 3.
Figure 4:
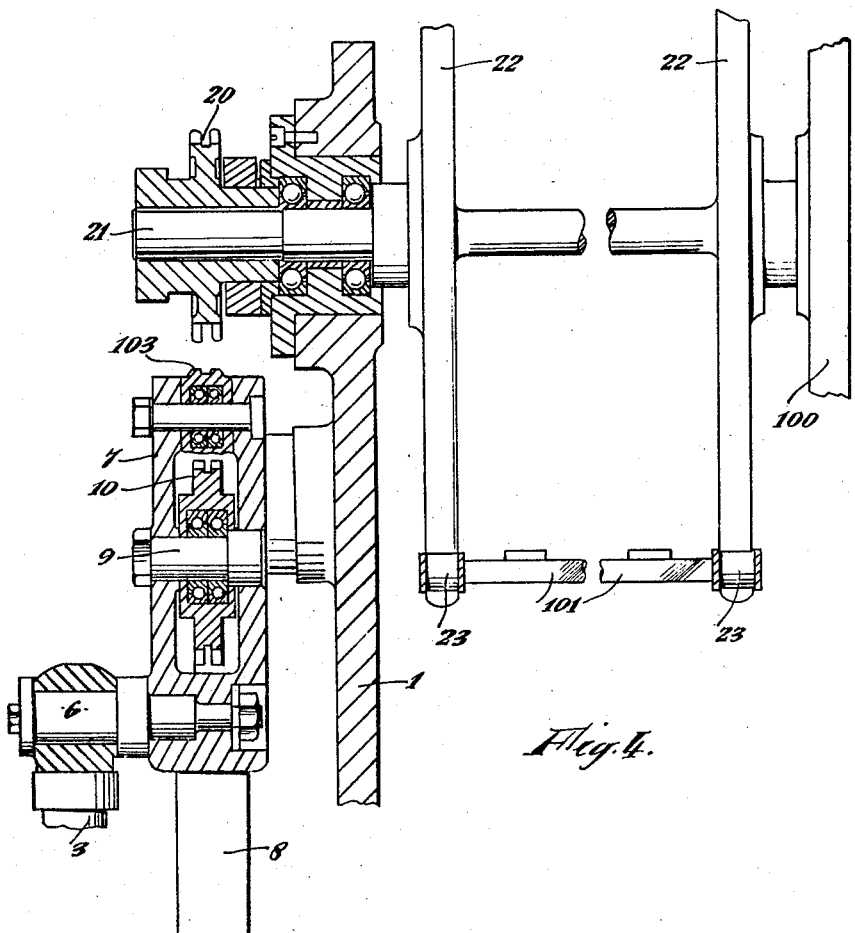
Fig. 4 is a section on line IV—IV in Fig. 3.

Referring to Figs. 1 and 2, there is shown a side frame 1 of the press supporting an input shaft 2 to which is secured a crank arm 3 having a crank pin 4 pivoted to one end of a connecting rod 5 whose other end is pivoted at 6 to a slide 7 mounted for linear motion in guides 8 in the frame 1 and having secured thereto a bearing pin 9 on which is journalled for free rotation a drive sprocket 10.

Mounted for free rotation on the frame 1 are two sprockets 11, 12 supporting an endless idle chain 13 which has a straight run 14 parallel to the guides 8.

An endless drive chain 15, having a straight run 16 parallel to the guides 8, is mounted on the frame 1 on sprockets 17, 18, 19 and 20, the latter sprocket being secured to an output shaft 21 which has also secured thereto a sprocket 22.

The sprocket 22 supports a sheet feed chain 23 having a straight feed run 24 between the sprocket 22 and a sprocket 25 secured at the other end of the frame 1 to a shaft 26. The shafts 21 and 26 are situated, respectively, at the pick up and release points of the feed run 24 of the chain 23, and in accordance with usual practice the chain 23 and the sprockets 22, 25 are duplicated on the other side of the press (not illustrated), and the chain 23 and the corresponding chain on the other side of the press support between them the usual sheet gripping devices.

The runs 14, 16 of the chains 13, 15 are positioned to engage the drive sprocket 10 at diametrically opposite points, and the slide 7 is provided with surfaces 27, 28 which support the chains 13, 15 in engagement with the drive sprocket 10.

The drive shaft 2 has secured thereto two cams 29, 30 adapted to act, respectively, on rollers 31, 32 mounted on a double-armed rocker 33 pivoted on the frame 1 at 34. The sprocket 12 has secured thereto a dog plate 35 provided with recesses 37 and 72. The sprocket 18 has secured thereto a dog plate 36 provided with recesses 38 and 73. The rocker 33 has secured thereto at one arm thereof a dog 39 and a pawl 39a defining locking elements positioned to engage the recesses 37 and 72, respectively. At its other arm the rocker 33 is provided with a dog 40 and a pawl 74 defining locking elements positioned to engage the recesses 38 and 73, respectively.

The cams 29, 30 are timed to impart to the rocker 33 a reciprocating pivotal motion such that when the crank pin 4 passes through its top dead centre position (this being the position illustrated) the dog 40 and the pawl 74 engage the recesses 38 and 73 respectively, and the dog 39 and pawl 39a withdraw from the recesses 37 and 72, respectively. Opposite conditions obtain when the crank pin 4 passes through its bottom dead centre position.

The travel of the crank pin 4 from the bottom of the top dead centre position is referred to as the driving phase and the other half of the journey of the pin 4 is referred to as the idle phase. The drawing illustrates the position of the pin 4 at the beginning of the idle phase having regard to the direction of rotation of the shaft 2 as indicated by the arrow 41. The dog 40 and pawl 74 are about to engage the dog plate 36 and thus lock the drive chain 15 against travel, while the dog 39 and pawl 39a are about to withdraw from the dog plate 35 and thus free the chain 13 for travel. During the ensuing idle phase the slide 7 travels from its top dead centre position towards its bottom dead centre position and the run 16 of the now stationary chain 15 acts as a stationary rack in respect of the drive sprocket 10 which in consequence forwards the chain 13 at twice the speed of travel of the slide 7 in the direction of the arrow 42, and no drive is transmitted to the output shaft 21. During the driving phase the conditions are reversed; the idle chain 13 stands still and the slide 7, during its journey from bottom to top dead centre forwards the chain 15, at twice the speed of travel of the slide in the direction of the arrow 43 and in consequence drive is imparted to the shaft 21.

The alternate locking and freeing of the chains 13, 15 converts the continuous rotary motion of the shaft 2 into an intermittent uni-directional rotation of the shaft 21 whereby is provided the necessary intermittent uni-directional motion of the sheet feed chain 23.

The pawl 39a is positioned to engage the plate 35 tangentially, and the dog 39 is positioned to engage the plate 25 radially. The dog 39 and the pawl 39a are so positioned relative to one another that a slight angular movement imparted to the plate 35 when the pawl 39a is pressed home in the recess 72 causes the recess 37 to be pressed tangentially against the dog 39 whereby the plate 35 is firmly locked in position. The pawl 74 and dog 40 co-operate in the same manner.

The dog 39 and pawl 39a are formed as extensions of a slide 44 which is mounted on the rocker 33 and whose position is adjustable by screws 46, 47. The dog 40 is formed as an extension of a slide 45 which is mounted on the rocker 33 and whose position is adjustable by screws 46a, 47a. The pawl 74 is pivotally mounted on the rocker 33 by means of an eccentric pin whereby the position of the pawl 74 is independently adjustable.

The dog plates 35 and 36 are provided with one-way recesses 48 and 49, respectively, adapted to cooperate with spring loaded pawls 50 and 51, respectively, the recesses 48, 49 being timed to be engaged by the pawls 50, 51 at the ends of the journeys of the dog plates 35, 36, whereby any reverse travel of the dog plates 35, 36 and thus of the chains 13, 15 is prevented while the rocker 33 is in motion, and the control of the chains 13, 15 is in this respect made independent of the dogs 39, 40 and pawls 39a, 74.

Momentum reducing means are provided for the whole mechanism including the sheet feed chain 23 and its associated sprockets.

The momentum reducing means comprise in respect of the shaft 21 a crank 52 adapted to act on a dash pot 53 comprising a cylinder 54, and a piston 55 connected by a piston rod 56 to the crank 52, the dash pot 53 being pivoted at the end opposite to the crank 52 to the frame 1 at 57. The ends of the cylinder 54 are connected by flexible ducts 58, 59 leading through a shut-off valve 60. The ducts 58, 59 define openings in the ends of the cylinder 59 controlled by the valve 60. The valve 60 is operated by a cam 61 secured to the shaft 21 and timed to close the valve 60 during the second half of the driving phase of the crank arm 3 whereby air is compressed in one end of the cylinder 54 and a partial vacuum is formed in the other end thereof, and the momentum on deceleration of the chains 15 and 23 and their associated members (such as the sprockets 17, 18, 19, 20, 22, the slide 7 and the connecting rod 5), is reduced to be substantially nil at the end of the driving phase, at which end the valve 60 is opened and kept open thereafter during the idle and the first half of the next driving phase. In other words the air in the dash pot 53 may make a free circuit between the upper and lower ends of the cylinder except during the decelerating half of the driving phase. The crank 52 provided with means for being angularly adjusted relative to the shaft 21, and thus relative to the cam 61, to facilitate the timing of the dash pot 53.

At the discharge end of the feed run 24 of the chain 23 momentum reducing means comprise a brake drum 62 secured to the shaft 26 and adapted to be acted upon by a brake shoe 63 pivoted to the frame 1 at one end 64 and pivoted at its other end 65 to a dash pot 66 adapted to be actuated by a crank 67 secured to a shaft 68 having a 1:1 connection with the input shaft 2. The dash pot 66 comprises a cylinder 69 and piston 70 connected to a piston rod 71. The dash pot 66 is pivoted at one end to the brake shoe 63 at said end 65 thereof while at the other end of the dash pot 66 the piston rod 71 is pivoted to the crank 67. The dash pot 66 acts as a link between the brake shoe 63 and the crank 67 which is timed to press the brake shoe 63 onto the brake drum 62 during the second half of the driving phase of the shaft 2, the appropriate dead centre position of the crank 67 being reached at the end of the driving phase. The dash pot 66 is provided with a valve controlled connection between the ends of the cylinder 69 analogous to the ducts 58, 59 and the valve 60 illustrated in respect of the dash pot 53 and not illustrated in the present case. The valve for the dash pot 66 is controlled by a cam timed to close the valve only during the second half of the driving phase so that during that period air is compressed in the cylinder 69 and the brake shoe 63 is pressed on to the drum 62.

It will be appreciated that the action of the dash pots 53, 66 can be timed precisely by adjustment of relative angular positions of the associated cranks and cams, and that in consequence there is obtained a good control over the momentum of all moving parts.

The mechanism illustrated in Figs. 3 to 7 is in many respects similar to that illustrated in Figs. 1 and 2, and like reference numerals are used for like parts.

Referring to Figs. 3 to 7, there is provided a side frame 1 of the press supporting an input shaft 2 to which is secured a crank arm 3 having a crank pin 4 pivoted to one end of a connecting rod 5 whose other end is pivoted at 6 to a slide 7 mounted for linear motion in giudes 8 secured to the frame 1. The crank arm 3 and connecting rod 5 define a means for converting continuous rotary motion of the input shaft 2 into reciprocating motion of the slide 7 in the guides 8. The slide 7 has secured thereto a bearing pin 9 on which is journalled for free rotation a drive sprocket 10.

Mounted for free rotation on the frame 1 are two sprockets 11, 12 supporting an endless idle chain 13 which has a straight run 14 parallel to the guides 8.

An endless drive chain 15, having a straight run 16 parallel to the guides 8, is mounted on sprockets 18, 20. The sprocket 18 is supported for free rotation on the frame 1, and the sprocket 20 is secured to an output shaft 21 journalled at one end in the frame 1 and the other end in a corresponding frame 100. Two sprockets 22 are secured in spaced apart relationship to the output shaft 21, and sheet feed chains 23, 23 mounted on the sprockets 22 support between them a sheet gripping device 101. Figs. 3 to 7 illustrate one end of the press, and it is to be understood that the chains 23 extend to the other end of the press and are there supported on sprockets analogous to the sprocket 25 described with reference to and shown in Fig. 1.

The runs 14, 16 of the chains 13, 15 engage the drive sprocket 10 at diametrically opposite points. The slide 7 is provided with two jockey sprockets 102, 105 defining members positioned to force the chains 13, 15 into arcuate engagement with the drive sprocket 10. The jockey sprocket 102 is so positioned above and towards one side of the drive sprocket 10 that the chain 13 is obliged to engage the drive sprocket 10 in an arc 104 whereby good engagement is ensured between the chain 13 and the drive sprocket 10. The jockey sprocket 103 provides similarly for the chain 15. The input shaft 2 has secured thereto a rotor or disc 105 provided with a concentric arcuate lug 106 defined by a concave wall 107, a convex wall 108, a leading end 109 and a trailing end 110. The sprockets 12, 18 are situated for their axes to lie on diametrically opposite sides of the axis of the input shaft 2 and in juxtaposition therewith. The sprocket 12 has secured thereto a rotor disc 111 provided with an arcuate groove 112 defined by a concave wall 113 and a convex wall 114, the ends of the groove 112 being open to the circumference of the disc 111. Likewise, the sprocket 18 has secured thereto a rotor or disc 115 provided with an arcuate groove 116 defined by a concave wall 117 and a convex wall 118. The discs 105, 111, 115 are so positioned, and the lug 106 and the grooves 112, 116 are so dimensioned, that the lug 106 may slide through the grooves 112, 116 when the mechanism is in the illustrated position. In other words, the convex face 108 or the lug 107 defines a concentric arcuate portion of the disc 105, the concave face 117 of the groove 116 defines an arcuate portion on the disc 115 and has a radius whose centre is so positioned that it coincides with the centre of the disc 105 when the disc 115 is in the illustrated angular position, and the radii of the faces 108, 117 are so related that the face 108 may engage the face 117 with a sliding fit, whereby during such engagement the disc 115 is held against rotation and the chain 16 is held against travel while the disc 105 rotates, the holding action being improved by similar engagement between the faces 107, 118. Corresponding conditions obtain in respect of the disc 111 between the lug 106 and the groove 112. The input shaft 2 is continuously rotated in the direction of the arrow 41, and the discs 105, 111, 115 are so timed relative to the crank pin 4 that when the latter is in the top dead centre position, this being the illustrated position, the leading end 109 of the lug 106 commences engagement with the groove 116 while the trailing end 110 of the lug 106 leaves the groove 112, whereby on continued rotation of the crank arm 3 the chain 15 is locked against travel while the chain 13 becomes free to move.

The travel of the crank pin 4 from the top to the bottom dead centre position is referred to as the idle phase and the other half of the journey of the crank pin 4 is referred to as the driving phase. Fig. 3 shows the position of the crank pin 4 at the beginning of the idle phase. During the idle phase the drive chain 15 is held and the slide 7 travels downwards whereby the drive sprocket 10 rolls on the drive chain 15 and imparts to the idle chain 13 a movement in the direction of the arrow 42 at twice the speed of travel of the slide 7. The diameter of the sprocket 12 is such that it makes one whole revolution during the idle phase so that at the end of the idle phase the groove 112 is presented in the proper position for engagement by the lug 106. During the driving phase the conditions are reversed: the idle chain 13 stands still and the slide 7, during its journey from its bottom to its top dead centre position, forwards the chain 15 at twice the speed of travel of the slide 7 in the direction of the arrow 43, and in consequence drive is imparted to the output shaft 21. The diameter of the sprocket 18 is such that it makes one whole revolution during the driving phase so that at the end of the driving phase the groove 116 is again presented in the proper position for engagement by the lug 106.

It will be seen that the lug 106 changes its engagement with the grooves 112, 116 when the slide 7 stands still at the dead centre positions of the crank pin 4. For practical purposes the slide 7 can be regarded as being stationary for several degrees of angular motion of the crank pin 4 to either side of its dead centre positions, whereby there is sufficient time for the lug 106 to change from the groove 112 to the groove 116 and vice versa without being prevented from doing so by any material angular movement of the discs 111, 115.

As in the example described with reference to Fig. 1, the alternate locking and freeing of the chains 13, 15 converts the continuous rotary motion of the input shaft 21 whereby is provided the necessary intermittent unidirectional motion of the sheet feed chains 23.

The example described with reference to Figs. 3 to 7 may of course be provided with momentum reducing devices such as the dash pots 53, 66 described with reference to and illustrated in Fig. 1.

What I claim and desire to secure by Letters Patent is:

1. A mechanism for converting continuous into intermittent motion comprising an input shaft, a slide supported for rectilinear motion in a guide, means for converting continuous rotary motion of said shaft into reciprocating motion of the slide along said guide, a freely rotatable chain drive sprocket mounted on said slide, first and second endless chains supported on sprockets, said chains being positioned to have straight runs parallel to said guide and positioned for said runs to engage said drive sprocket at diametrically opposite points thereof, locking means for locking said chains against travel, said locking means being timed to act alternately on said chains to lock said first chain whilst freeing said second chain and vice versa, the locking means being timed to lock or free the chains when the slide stands still; whereby, on movement of the slide, the drive sprocket rolls on the locked chain and imparts movement to the free chain and continuous rotary motion of said input shaft is translated into uni-directional intermittent motion of said chains.

2. A mechanism according to claim 1 wherein said means for converting continuous rotary motion of said shaft into reciprocating motion of said slide comprise a crank arm secured to the input shaft and connected to the slide by a connecting rod.

3. A mechanism according to claim 1, wherein the locking means in respect of at least one of said chains comprise a pivotal arm, means for imparting reciprocating pivotal motion to the arm to move the arm between a locking and a freeing position, the arm being provided with a locking element and being positioned so that the locking element engages and locks the chain when the arm is moved into the locking position and vice versa.

4. A mechanism according to claim 1, wherein the locking means in respect of at least one of said chains comprise a first rotor provided with means for being continuously rotated, a second rotor connected to the chain to be rotated thereby, the rotors being disposed in juxtaposition and have parallel axes of rotation, the first rotor being provided with a first concentric arcuate portion, the second rotor being provided with a second arcuate portion having a radius substantially equal to that of the first arcuate portion and being positioned on the second rotor so that in one angular position thereof the centres of the arcuate portions coincide, the rotors being timed so that in said one angular position of the second rotor the first arcuate portions slidingly engages the second arcuate portion to lock the second rotor and thus the chain against movement while the first rotor rotates, disengagement of arcuate portions by continued rotation of the first rotor again freeing the chain for movement.

5. A mechanism according to claim 1 wherein in addition to said drive sprocket there is provided on said slide in respect of at least one of said chains a member positioned to force the chain into arcuate engagement with the drive sprocket.

6. A mechanism according to claim 1, comprising an output shaft to which is secured a sprocket engaged by one of the chains, a pair of output sprockets secured to the output shaft, two sheet feed chains engaging the output sprockets and provided with sheet gripping devices.

7. A mechanism according to claim 1, comprising a crank secured to a shaft rotated in synchronism with the travel of one of the chains engaging said drive sprocket, a pneumatic cylinder containing a piston connected by a piston rod to the crank, the piston being timed to be substantially at the end of a stroke and adjacent a closed end of the cylinder when the chain stands still, an opening in said closed end of the cylinder, a shut-off valve for opening or closing the opening, means for opening and closing the valve, said means being timed to close the valve when the piston decelerates during the stroke in which it approaches the closed end of the cylinder.

8. A mechanism according to claim 1, comprising a crank secured to a shaft rotated in synchronism with said input shaft, a brake drum secured to a shaft rotated in synchronism with one of the chains engaging said drive sprocket, a brake shoe positioned to co-operate with the brake drum, a link pivotally connected at one end to the crank and at the other end to the brake shoe, the crank being timed to move the brake shoe through the intermediary of the link into contact with the brake drum when the chain decelerates, said link comprising a pneumatic cylinder containing a piston connected to a piston rod, the piston being timed to be substantially at the end of a stroke and adjacent a closed end of the cylinder when the chain comes to a halt, an opening in the closed end of the cylinder, a shut-off valve for opening or closing the opening, means for opening or closing the valve, said means being timed to close the valve when the piston decelerates during the stroke in which it approaches the closed end of the cylinder.

9. A mechanism according to claim 7, wherein means are provided for adjusting the angular position of the crank relative to the shaft to which it is secured.

10. A mechanism according to claim 8, wherein means are provided for adjusting the angular position of the crank relative to the shaft to which it is secured.

11. A mechanism for converting continuous into intermittent motion comprising an input shaft, a slide supported for rectilinear motion in a guide means for converting continuous rotary motion of said shaft into reciprocating motion of the slide along said guide, a freely rotatable chain drive sprocket mounted on said slide, first and second endless chains supported on sprockets, said chains being positioned to have straight runs parallel to said guide and positioned for said runs to engage said drive sprocket at circumferentially spaced apart points thereof, locking means for locking said chains against travel, said locking means being timed to act alternately on said chains to lock said first chain whilst freeing said second chain and vice versa, the locking means being timed to lock or free the chains when the slide stands still; whereby, on movement of the slide, the drive sprocket rolls on the locked chain and imparts movement to the free chain and continuous rotary motion of said input shaft is translated into uni-directional intermittent motion of said chains.

No references cited.